US011817975B2

(12) United States Patent
Lanneer et al.

(10) Patent No.: US 11,817,975 B2
(45) Date of Patent: Nov. 14, 2023

(54) EQUALIZER AND AN EQUALIZER TRAINING UNIT FOR DATA-DEPENDENT DISTORTION COMPENSATION

(71) Applicant: Nokia Solutions and Networks Oy, Espoo (FI)

(72) Inventors: Wouter Lanneer, Antwerp (BE); Yannick Lefevre, Heverlee (BE); Paschalis Tsiaflakis, Schriek (BE); Werner Coomans, Zellik (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/670,889

(22) Filed: Feb. 14, 2022

(65) Prior Publication Data

US 2022/0271979 A1 Aug. 25, 2022

(30) Foreign Application Priority Data

Feb. 23, 2021 (EP) .................................... 21158710

(51) Int. Cl.
*H04L 25/03* (2006.01)
*H04L 25/02* (2006.01)

(52) U.S. Cl.
CPC .... *H04L 25/03343* (2013.01); *H04L 25/0212* (2013.01); *H04L 2025/03815* (2013.01)

(58) Field of Classification Search
CPC ........... H04L 25/03343; H04L 25/0212; H04L 2025/03815; H04L 25/0226; H04L 25/03331; H04L 25/03114; H04B 10/2507; H04B 10/6971
See application file for complete search history.

(56) References Cited

U.S. PATENT DOCUMENTS

2004/0196928 A1 10/2004 Hessel
2006/0274852 A1* 12/2006 Trachewsky .......... H04L 1/0025 375/295
2008/0310531 A1* 12/2008 Bai ..................... H04L 27/2613 375/260
2017/0279531 A1* 9/2017 Drummond ...... H04B 10/25073
2020/0366536 A1 11/2020 Kang et al.

FOREIGN PATENT DOCUMENTS

CA 2264789 A1 3/1998

OTHER PUBLICATIONS

European Search Report for European Patent Application No. 21158710 dated Aug. 27, 2021.

* cited by examiner

*Primary Examiner* — Sung S Ahn
(74) *Attorney, Agent, or Firm* — Harness, Dickey & Pierce, P.L.C.

(57) ABSTRACT

The present disclosure relates to an equalizer training unit for deriving equalization parameters for compensating data-dependent distortion in received samples by use of a training sequence including a sequence p>1 times and cyclically comprising N sub-sequences of respective combinations of L time-domain symbols of a modulation scheme, wherein the N sub-sequences are cyclically arranged in a selected order and such that L−1 symbols of a respective sub-sequence overlap with symbols in the preceding and following sub-sequences. The present disclosure further relates to a training sequence generator unit for generative the training sequence and an equalizer employing the equalizer training unit.

13 Claims, 6 Drawing Sheets

EQUALIZER AND AN EQUALIZER TRAINING UNIT FOR DATA-DEPENDENT DISTORTION COMPENSATION

CROSS-REFERENCE TO RELATED APPLICATIONS

This application claims priority to and the benefit of European Patent Application No. 21158710.0 filed on Feb. 23, 2021, the entire contents of each of which are incorporated herein by reference.

TECHNICAL FIELD

The present disclosure relates to the equalization of received signals in communication networks and more specifically to equalization of received signals in optical networks operating at high data rates.

BACKGROUND

Passive optical networks are a telecommunication technology providing fiber broadband access to end-users. An optical network typically comprises a point-to-multipoint configuration in which an Optical Line Terminal, OLT, i.e. a service provider endpoint, is coupled to multiple near-user endpoints, i.e. Optical Network Units, ONU, via an Optical Distribution Network, ODN, forming the optical transmission medium, i.e. the communication channel, between the OLT and the ONUs.

In such communication networks, the optical fiber introduces chromatic dispersion, i.e. the different wavelengths of the optical communication signal will propagate at slightly different speeds through the channel. The dispersion impact gets stronger with increasing communication speeds due to the wide optical signal frequency content. Transmitting a signal through such a channel causes data-dependent distortion which is commonly referred to as inter-symbol interference. In addition to this dispersive channel, such networks may employ bandwidth-limited transceivers, i.e. the bandwidth of the transceiver may be narrower than the bandwidth provided by the network, which causes further data-dependent distortions in the received signal. Furthermore, due to the nonlinear characteristics of the communication channel and the optical transmit-receive chain, i.e. the end-to-end channel, these distortions are also non-linear and become severe in optical networks operating at higher rates such as 25G and higher.

SUMMARY

It is an object of embodiments of the present disclosure to provide a solution enabling efficient data-dependent distortion compensation in communication networks. It is a further object of embodiments of the present disclosure to provide efficient data-dependent distortion compensation in optical networks operating at high data rates.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by an equalizer training unit for deriving equalization parameters for compensating data-dependent distortion in received samples, the equalizer training unit comprising at least one processor and at least one memory including computer program code, the at least one memory and computer program code configured to, with the at least one processor, cause the equalizer training unit to perform:

- obtaining samples corresponding to a training sequence transmitted from a communication device, the training sequence comprising a predetermined sequence $p>1$ times, the predetermined sequence cyclically comprising N sub-sequences of all respective combinations of L time-domain symbols of a predetermined modulation scheme, wherein the N sub-sequences are cyclically arranged in a selected order and such that $L-1$ symbols of a respective sub-sequence overlap with symbols in the preceding and following sub-sequences;
- estimating N sets of parameters based on the obtained samples and by taking into account the periodic properties of the predetermined sequence;
- deriving an offset based on the estimated parameters and by taking into account the cyclic properties of the predetermined sequence; and
- determining the equalization parameters based on the estimated parameters and the derived offset.

In other words, the samples obtained by the equalization training unit correspond to the transmitted training sequence but are distorted by the end-to-end channel and contaminated by random noise. As the training sequence is characterized by specific periodic and cyclic properties, the obtained samples will also exhibit the same periodic and cyclic properties when ignoring the random noise. The obtained samples will, thus, form a sample sequence comprising N samples $p>1$ times, with every sample corresponding to one specific symbol sub-sequence in the predetermined sequence, and where the ordering of the respective samples corresponds to the cyclic ordering of the N symbol sub-sequences in the predetermined sequence but are cyclically shifted. The cyclic shift results from the arbitrary and a priori unknown time misalignment between the transmitted training sequence and the received or obtained sample sequence.

The equalizer training unit processes the obtained samples by exploiting the periodic properties of the obtained samples to estimate a set of parameters that will also exhibit the same cyclic shift as the samples. The estimated parameters are then used to derive the cyclic shift. The derivation of the cyclic shift exploits the properties of the predetermined sequence, and more specifically, the values and the ordering of the sub-sequences therein. Using the values of the estimated parameters and the derived offset, i.e. the cyclic shift, the equalization parameters are determined.

As a result, the specific properties of the training sequence allow the equalizer training unit to start processing the obtained samples, i.e. to train the equalizer training unit, without the need of synchronizing or aligning the obtained samples with the training sequence. Thus, a training scheme is enabled where the synchronization is performed simultaneously with the training. Thus, there is no need to reserve part of the preamble or pilot training sequence for synchronization purposes, i.e. the entire preamble training sequence is used for the derivation of the equalization parameters.

Further, as the equalizer training unit is aware of the transmitted training sequence, the equalization parameters are directly derived from the obtained samples without the need for decisions on the obtained samples as in the blind or decisioned directed training which cause additional error propagation. Hence, a so-called pilot training scheme with low computational complexity is achieved, resulting in an equalizer's training unit with increased performance in comparison to conventional equalizer training units.

The predetermined sequence may be further designed to correspond to a maximum length sequence or Golay sequence. This allows the equalization training unit to achieve good synchronization and channel estimation performance. Further, the predetermined sequence may be designed to be characterized with a minimum number of consecutive identical digits, CID, or a maximized flatness of its frequency spectrum, in order to minimize DC wander and facilitate the operation other blocks in the transceiver such as the clock and data recovery (CDR). Furthermore, the predetermined sequence may be designed to have hierarchical properties, i.e. the predetermined sequence cyclically comprises sub-sequences of different lengths which are present a certain number of times within the predetermined sequence depending on their length. Using a training sequence with the above properties allows removing a bias in the equalizer parameters for channels that exceed the equalizer capabilities, and allows for flexible determination of the equalization parameters for different equalizer settings, i.e. number of MLSE taps, in a fast and accurate way with the same training sequence.

According to an example embodiment, the estimating comprises:

- grouping the obtained samples in p non-overlapping sets of N subsequent samples in accordance with their order of reception;
- indexing the N subsequent samples of the respective p sets in accordance with their order in the set to obtain N sets of p samples associated with respective indices; and
- processing the samples associated with the respective indices, thereby obtaining the N sets of parameters associated with the respective indices.

According to an example embodiment, the obtained N sets of parameters comprise values indicative for the samples' values associated with the respective indices.

In other words, before processing the obtained samples, the samples are split into p sets in accordance with their order followed by indexing the samples of the respective p sets. Doing so allows to process the samples of the respective sets in groups according to their indexes. As a result, the samples of the respective sets with corresponding indexes are processed together to obtain the sets of parameters. As a result, N groups of p samples are processed to obtain N sets of parameters. The processing of the respective groups of p samples may be done in accordance with the order of the indices or any other order.

By pre-processing the samples in this matter, the samples corresponding to respective indices are converted into sets of parameters which are then processed to obtain the equalization parameters that are used by the equalizer. These sets of parameters comprise values that are indicative of the samples' values associated with the respective indices and thus the respective N symbol sub-sequences. As a result, a very low complexity pilot training is enabled.

The pre-processing comprises calculating a mean and a variance for the respective groups of samples. Alternatively, the pre-processing may comprise deriving histograms for the respective groups of samples.

According to an example embodiment, the deriving comprises correlating the values from the N sets of parameters with the predetermined sequence.

In other words, the offset or the cyclic shift of the estimated parameters with respect to the predetermined sequence is derived by correlating the values of the estimated parameters with the predetermined sequence. In practice, this is done by correlating the values of the estimated parameters with cyclically shifted versions of the predetermined sequence or by calculating the circular cross-correlation between the values of the estimated parameters and the predetermined sequence.

According to an example embodiment, the determining comprises cyclically shifting the N sets of parameters according to the derived offset and determining the equalization parameters for the corresponding N sub-sequences based on the shifted sets of parameters.

According to an example embodiment, one or more of the N sub-sequences are repeated two or more times within the predetermined sequence, and wherein the determining further comprises combining the corresponding obtained sets of parameters taking into account the occurrences of the respective N sub-sequences within the predetermined sequence.

According to an example embodiment, the respective N sub-sequences are repeated an equal number of times within the predetermined sequence.

Repeating one or more sub-sequences within the predetermined sequence is especially relevant in case the data-dependent distortion is longer than the number of taps of the equalizer. Thus, increasing the length of the predetermined sequence and hence its period N, and averaging the obtained sets of parameters by taking into account the occurrences of the sub-sequences, allows avoiding biased equalization parameters and poor equalization performance.

According to an example embodiment, the estimating, the deriving, and the determining are performed iteratively, wherein at a respective iteration the estimating, the deriving, and the determining are performed on one or more of the obtained samples.

According to an example embodiment, the determining further takes into account one or more previously determined equalization parameters.

Using previously determined equalization parameters decreases the estimation convergence time and hence allows to use shorter preamble sequences in the subsequent burst. For example, the preamble of the initial transmission from an ONU can contain a long training sequence, whereas the preamble of the subsequent transmissions contains shorter training sequences. The length of the training sequence may be gradually shortened with each transmission. For example, the length of the training sequence may be shortened by multiple of two with each ONU's transmission until some minimum length is reached.

According to an example embodiment, the obtained N sets of parameters are averaged by means of an exponential moving averaging with the one or more previously determined N sets of parameters.

In other words, the determined equalization parameters are correspondingly averaged with the previously determined equalization parameters using exponential moving averaging.

According to an example embodiment, the obtained samples are pre-processed by a linear equalizer and/or a nonlinear equalizer.

The pre-processing of the obtained samples with a linear or a non-linear equalizer function as a channel or data-dependent distortion shortening filter and possibly as a noise whitening filter. An example of a linear equalizer is the feed-forward equalizer, FFE, and an example of a non-linear equalizer is the decision feedback equalizer, DFE. Pre-processing of the obtained samples allows reducing the complexity of the EQ training unit and in turn the complexity of the equalizer itself as it enables usage of an equalizer with a fewer number of taps.

According to a second example aspect, an equalizer for compensating data-dependent distortion in received samples by equalizing the received samples based on equalization parameters is disclosed, the equalizer comprising an equalizer training unit configured to derive the equalization parameters, the equalizer training unit comprising at least one processor and at least one memory including computer program code, the at least one memory and computer program code configured to, with the at least one processor, cause the equalizer training unit to perform:

- obtaining samples corresponding to a training sequence transmitted from a communication device, the training sequence comprising a predetermined sequence p>1 times, the predetermined sequence cyclically comprising N sub-sequences of all respective combinations of L time-domain symbols of a predetermined modulation scheme, wherein the N sub-sequences are cyclically arranged in a selected order and such that L−1 symbols of a respective sub-sequence overlap with symbols in the preceding and following sub-sequences;
- estimating N sets of parameters based on the obtained samples and by taking into account the periodic properties of the training sequence;
- deriving an offset based on the estimated parameters and by taking into account the properties of the predetermined sequence; and
- determining the equalization parameters based on the estimated parameters and the derived offset.

The various example embodiments of the first example aspect may be applied as example embodiments to the second example aspect.

According to a third example aspect, a training sequence for use in an equalizer training unit for deriving equalization parameters for compensating data-dependent distortion in received data is disclosed, the training sequence comprising a sequence p>1 times, the sequence cyclically comprising N sub-sequences of all respective combinations of L time-domain symbols of a predetermined modulation scheme, wherein the N sub-sequences are cyclically arranged in a selected order and such that L−1 symbols of a respective sub-sequence overlap with symbols in the preceding and following sub-sequences.

According to an example embodiment, the training sequence is characterized with a minimum number of consecutive identical digits, CID, or wherein the training sequence is characterized with a maximized flatness of its frequency spectrum.

The other example embodiments of the first example aspect may be applied as further example embodiments to the third example aspect.

According to a fourth example aspect, a training sequence generator unit is disclosed, comprising at least one processor and at least one memory including computer program code, the at least one memory and computer program code configured to, with the at least one processor, cause the training sequence generator unit to generate a training sequence for use in a communication device for compensating data-dependent distortion in received data, the training sequence comprising a sequence p>1 times, the sequence cyclically comprising N sub-sequences of all respective combinations of L time-domain symbols of a predetermined modulation scheme, wherein the N sets are cyclically arranged in a selected order and such that L−1 symbols of a respective sub-sequence overlap with symbols in the preceding and the following sub-sequences.

The various example embodiments of the first example aspect may be applied as example embodiments to the fourth example aspect.

BRIEF DESCRIPTION OF THE DRAWINGS

Some example embodiments will now be described with reference to the accompanying drawings.

DETAILED DESCRIPTION OF EMBODIMENT(S)

The techniques described in the below embodiments may be applied to any type of time-division multiplexing, TDM, or time-wavelength-division multiplexing, TWDM, based PON technology, such as gigabit PON, G-PON, ethernet PON, E-PON, and even higher speed PONs, such as 10-gigabit symmetrical PON, XGS-PON, 50-gigabit PON, and others. Apart from their application to wired communication technologies, such as optical networks, these techniques may be applied to wireless communication technologies.

Figure 1A:
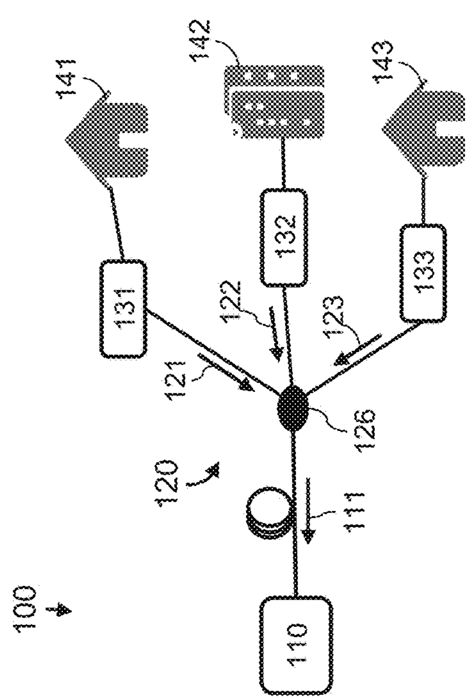
FIG. 1A shows an example embodiment of an optical network.

FIG. 1A shows an example architecture of an optical network 100 which may be operable according to a certain PON standard or technology as detailed above. The optical network 100 comprises an OLT 110 and a plurality of endpoints or ONUs, 131-133, via an optical distribution network, ODN 120 forming the optical transmission medium between the OLT and the ONUs. In this example, the OLT 110 is coupled to three endpoints. The ODN has a tree structure and thereto comprises an optical feeder fibre 111, a passive optical splitter/multiplexor 122, and N optical distribution fibres or drop fibres 123-125 that connect the splitter 126 to the respective ONUs 131-133. In the downstream, a passive splitter splits the optical signal coming from the OLT into N lower power optical signals to N ONUs 131-133. In practice, the ODN may comprise a concatenation of multiple passive splitters or passive optical taps between the OLT and the ONUs.

Between the OLT 110 and the ONUs 131-133 data is exchanged in the form of optical signals. To this end, the OLT 110 and the ONUs 131-133 each comprise an optical transceiver. An optical transceiver comprises an optical receiver such as a photodiode and an optical transmitter such as a transmitting laser. The optical signal produced by the transmitting laser of an ONU 131-133 or the OLT 110 is transmitted over the ODN and received by the photodiode of the OLT 110 or the ONUs 131-133.

Due to the limited bandwidth of the channel itself and the limited bandwidth of the optical receiver, inter-symbol interference, ISI, is observed in the received signal. In other words, the samples of the received signal not only depend on the corresponding transmitted data symbol but on the previous and/or following data symbols as well. Further, in such networks the communication channel and the optical transmit-receive chain typically have nonlinear characteristics, causing these distortions to be non-linear.

Figure 1B:
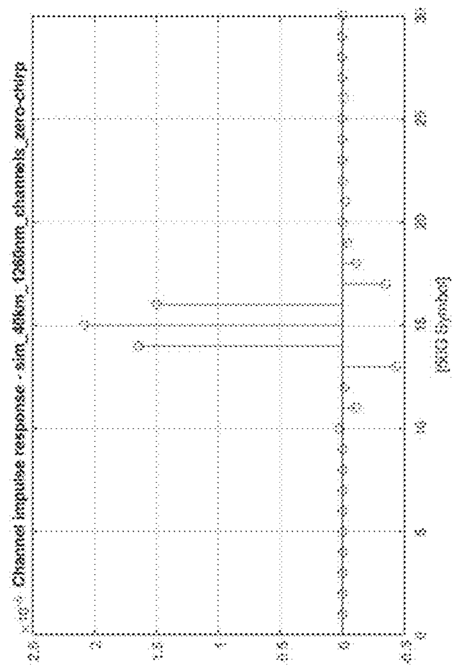
FIG. 1B shows an example channel impulse response of the optical communication channel of FIG. 1A.

FIG. 1B shows an example of an impulse response estimation for such bandlimited channel for 40 km of the optical fiber at 1260 nm using an Externally Modulated Laser with Semiconductor Optical Amplifier, EML+SOA, with zero chirp, i.e. $\alpha=0$, and dispersion D=−4.707 ps/nm over 40 km and a total dispersion $D_{total}=-188.28$ ps/nm. It clearly shows that the channel impulse is spread out over multiple samples and that there is strong ISI, i.e. the presence of high non-peak coefficients.

To correctly recover the symbols from the received samples corrupted by the ISI and thus enable reliable communication, communication networks, such as the optical networks of FIG. 1A, employ an (electrical) analog-to-digital converter, ADC, at the receiver, in combination with channel equalization and, possibly, error correction techniques. The channel equalization is typically based on digital signal processing, DSP, and aims at recovering the data-dependent distortions in the received samples caused by the ISI. Error correcting, on the other hand, involves the insertion of a suitable error correction code, i.e. redundant data, into the data stream to be transmitted to facilitate the detection and correction of data errors. Channel equalization considered in this invention are equalizers based on maximum likelihood sequence estimation, MLSE, and maximum a posteriori, MAP, based-estimation or variations thereof. Error correction is typically based on forward error correcting, FEC, techniques which may be implemented according to a variety of FEC schemes such as block codes, e.g., Reed-Solomon codes, convolutional, i.e. Viterbi, codes, turbo convolutional and low-density parity check, LDPC, codes. Thus, at the receiver, the corrupted samples are first equalized by the channel equalizer to reduce the inter-symbol-interference. The resulting sample sequence is then processed by the FEC decoder which corrects the errors therein using the controlled redundancy introduced at the transmitter. These concepts are now explained in more detail.

Figure 1C:
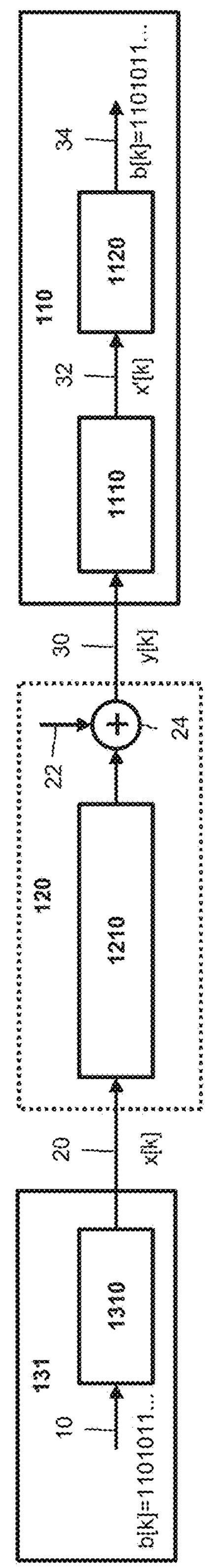
FIG. 1C shows an example digital representation of the communication link of the optical network of FIG. 1A.

FIG. 1C shows a simplified digital representation of the optical network of FIG. 1A and, more specifically, a simplified digital representation of an ONU's transmitter and an OLT's receiver. At the transmitter of the ONU 131, the FEC encoder and modulation module 1310 add redundant bits to the data bits 10, i.e. b[k], to be transmitted resulting in encoded data bits b[k]. As detailed above, the redundant bits allow an FEC decoder to reduce the total number of errors using this redundancy. After the encoding, the FEC encoder and modulation module 1310 digitally modulates the encoded data bits b[k] onto symbols 20, i.e. x[k], in accordance with the modulation scheme employed by the optical network. Typically, digital modulation schemes such as, for example, return to zero and non-return to zero, (N)RZ, unipolar signalling or on-off keying, OOK, polar signalling, or Manchester signalling are used. However, phase-shift keying such as BPSK, QPSK over two orthogonal channel dimensions, DPSK, or even pulse amplitude modulation schemes such PAM3 and PAM4, and combinations thereof, may be used as well.

In the case of NRZ-OOK modulation scheme, the signal to be transmitted 20 is a digital signal x[k] which is represented by the binary values +1 or −1 depending on the encoded data bit $b_k$. For example, a bit value $b_k=0$ corresponds to x[k]=+1, and a bit value $b_k=1$ corresponds to x[k]=−1. Another higher-order modulation scheme such as PAM4 would use the values of $x[k]\in[-1, -1/3, 1/3, 1]$.

The encoded and modulated signal 20, i.e. x[k], is then communicated over the ODN 120 which is a bandlimited, dispersive and noisy communication channel and received by the bandlimited optical receiver, i.e. the photodiode, of the OLT 110. The communication of the signal 20 over this channel and its reception at the OLT, distorts the signal. Herein, these distortions are represented as a combination of the distortion 1210 caused by the signal propagation over the fiber and the distortion caused by the non-linearities and bandlimited hardware of the ODN, the ONU transmitter 131, and the OLT's receiver 110. The summator 24 models the noise samples 22 which are added to the distorted signal.

As a result, the samples 30, i.e. y[k], received by the OLT 110 correspond to a distorted and noisy version of x[k]. To compensate for these distortions, the received samples 30 are processed by a channel equalizer 1110 to mitigate the ISI impact and provide an interference-reduced symbol sequence 32, i.e. x'[k], to the FEC decoder and demodulation module 1120 which then corrects the errors in the symbol sequence x'[k] and then demodulates it to obtain the data bits 34, i.e. b[k].

In this invention, channel equalizations based on maximum likelihood estimation, MLE, are used for the mitigation of the effects of the data-dependent distortion. MLE-based equalizers perform maximum likelihood sequence, MLSE, or a maximum a posteriori, MAP, estimation, or variations thereof, defined on trellis diagrams, by selecting the most likely symbol sequence, i.e. the one with maximum probability, from all transmitted sequences, given the received samples. The computational complexity of these approaches, however, grows exponentially with the length of the channel impulse response. Such equalizers can be implemented by various algorithms for instance the Viterbi algorithm with either soft or hard output, the Bahl Cocke Jelinek and Raviv, BCJR, soft output algorithm, and other variants. MLE-based equalizers are designed to be adaptable to the data-dependent distortions observed in the communication networks, which are unknown a priori at the receiver. To account for the observed distortions, a known symbol sequence, i.e. a training sequence, is transmitted to the receiver sufficiently often. The training sequence is then used by the training unit of the equalizer to determine the equalization parameters, often referred to as training.

In communication networks, such as optical networks, employing TDM or TWDM schemes, the training sequence is added in the preamble structure of each upstream transmission burst, i.e. the transmission from a respective ONU towards the OLT.

Figure 2:
FIG. 2 shows an example of a preamble according to the present disclosure.

FIG. 2 shows an example of such preamble structure 200. Typically, the preamble structure 200 comprises several segments of which one segment 220 is reserved for an equalization, EQ, training, i.e. the equalization training segment, and another segment 240 for separating the preamble 200 from the payload of the burst or the data, i.e. the delimiter segment.

In case conventional preamble or pilot training is used, the equalizer training amounts to first detect the boundary of the EQ training segment 220 in the received training sequence and then estimate the equalization parameters. In other words, a longer EQ training segment is required, as part of it is used for the signal synchronization and the other part for the equalization parameter estimation, resulting in increased overhead. Further, the signal synchronization needs to be both fast and accurate for the EQ training segment boundary to be detected under ISI, and is thus potentially computationally complex. Conventional blind or decision directed training without explicit signal synchronization may be used instead, where the output of the MLE-equalizer is used in bootstrapping mode to estimate the EQ training sequence via a decision device. Such blind or decision training techniques allow synchronizing the estimated EQ training sequence with the receive sample sequence, which due to decision errors, suffer from several drawbacks like for instance non-guaranteed convergence, higher steady state error performance, longer training convergence times, and further a closed feedback loop between the MLE equalizer and equalizer training unit which may further complicate the hardware design.

To reduce the signal synchronization overhead, which is especially critical in communication networks operating at high rates in burst-mode, as well as to limit the implementation complexity and processing speed requirements, the present disclosure describes a novel equalization training unit employing a novel training sequence to enable simultaneous signal synchronization and equalization parameters estimation. Only a heuristic mechanism is needed for signalling when the EQ training segment 220 has started without need for exactly determining the boundary of segment 220. This may be implemented by e.g. a fixed counter with equal duration length as the CDR preamble segment 210. The proposed novel training sequence, equalization training unit, and its operation will be now explained in detail below.

Figure 3B:
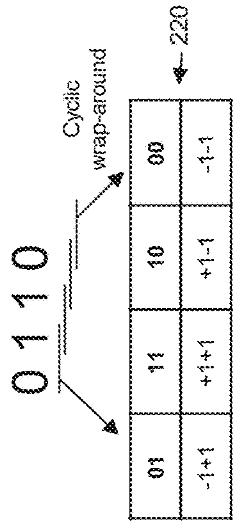
FIG. 3B shows an example of a predetermined sequence according to the present disclosure.
Figure 3C:
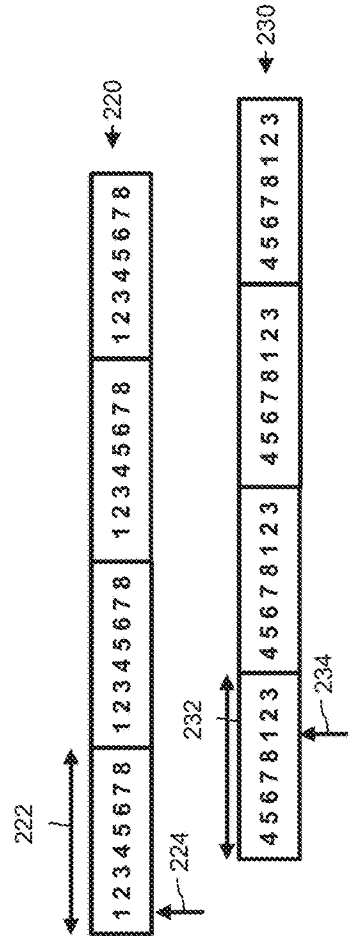
FIG. 3C shows schematic examples of the training sequence according to the present disclosure as transmitted by a transmitter (top) and as received by a receiver (bottom)
Figure 3A:
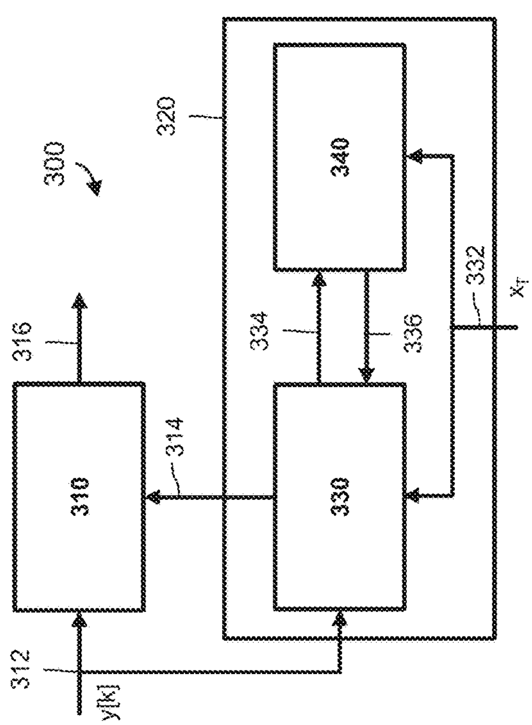
FIG. 3A shows an example embodiment of an equalizer according to the present disclosure.

FIG. 3A shows an equalizer according to embodiments of the present disclosure for compensating data-dependent distortions in communication networks such as the network shown in FIG. 1A.

As shown in the figure, the equalizer, EQ, 300 comprises an equalizer unit 310 which compensates for the data-dependent distortions of $L\geq 2$ consecutive symbols in the received data samples 312, i.e. $y[k]$, by equalizing the received data samples based on equalization parameters 314. The equalization parameters 314 are determined by the training unit 320 of the equalizer 300 by means of a predetermined training sequence 332, i.e. $x_T$. The EQ training unit 320 comprises an estimation unit 330 and a correlation unit 340 which are configured to process the training sequence transmitted over the communication network 312 and to determine the equalization parameters 314. The equalizer 300 may employ an MLSE or MAP estimation or a variation thereof.

The training sequence 220 according to the present disclosure comprises a predetermined sequence 222 of length N, i.e. $x_N=[x_1, \ldots, x_N]$, p>1 times. The predetermined sequence 222 cyclically comprises of N sub-sequences. The N sub-sequences comprise all M respective combinations of L time-domain symbols depending on the modulation scheme employed at the transmitter. The modulation scheme defines the possible values a time-domain symbol may have and, therefore, the possible received sequences of symbols. Each symbol sub-sequence in the predetermined sequence $x_N$ may be repeated more than once. The training sequence may, thus, contain more than just all possible M sub-sequences in every p period, resulting in a training sequence with a period length N and N≥M. Further, the N symbol sub-sequences in the predetermined sequence are cyclically arranged in a specific order and such that L−1 symbols of a respective sub-sequence overlap with symbols in the preceding and following sub-sequences. Thus, for a binary modulation scheme and a sub-sequence designed to contain two symbols, i.e. L=2, the sequence will comprise M=2^L=4 sub-sequences as all possible combinations of the L symbols equals 4, i.e., 4 the sub-sequences ‘00’, ‘01’, ‘10’ and ‘11’. An example of such a valid predetermined sequence cyclically including all M=N=4 sub-sequences exactly once is for instance 0110 which may be repeated one or more times, i.e. p≥2. The interpretation of the predetermined sequence as a cyclic set is shown in FIG. 3B. A second valid sequence with N=5 (>M) is for instance 01100 which includes sub-sequence 00 twice. Another example cyclically including all M=4 sub-sequences exactly twice (i.e. N=2 M) is for instance 01110100. Thus, if the ordering $\pi_n$ is defined as $\pi_n \in [1, M]$ for n=1 . . . N, then $\pi_n=i$ indicates that the i-th sub-sequence $x_i=[x_i^1, \ldots, x_i^L]$ is present at position m inside the sequence. Note that multiple $\pi_n$ equal i if sub-sequence $x_i$ is present at multiple positions in one period.

In the case of a PAM3 modulation scheme, ternary symbols, i.e., $x[k]=\{-1,0,1\}$ are transmitted which can have different mapping strategies. One strategy maps three bits to two consecutive symbols, which results in 8 valid sub-sequences of two symbols and excludes the sub-sequence ‘00’ from the modulation format. This means that if L=4, the shortest valid predetermined sequence contains cyclically all M=64 sub-sequences of 4 symbols exactly once without any occurrence of the ‘00’ sub-sequence.

The predetermined sequence may be designed to be DC balanced to minimize DC wander. For example, in an NRZ-OOK sequence, this can be guaranteed by ensuring an equal number of 1’s and 0’s in the predetermined sequence.

Further, the predetermined sequence may be optimized to have an autocorrelation property that resembles a Dirac impulse to obtain good synchronization and channel estimation performance by the correlation unit 340. This can be guaranteed by considering special types of sequences, such as maximum length sequences or (complementary) Golay code sequences. For instance, an example of an optimized predetermined sequence designed for a 4-tap MLSE equalizer and based on a maximum length sequence code and consisting of 32 bits of +1 and −1 symbol values corresponds to the code Ox F698 3915. This code is equivalent to a predetermined sequence of sub-sequences of 4 symbols, and in this case, also equivalent to a predetermined sequence of sub-sequences of 4 bits: F E D B 6 D A 4 9 3 6 C8 0 0 1 3 7 E C 9 2 4 8 1 2 5 A 5 B 7 F. In this optimized predetermined sequence, all 2^5=32 sub-sequences of 5 bits occur once, all 2^4=16 sub-sequences of 4 bits occur twice, all 2^3=8 sub-sequences of 3 bits occur thrice, and so on.

Such sequence is characterized by a maximum autocorrelation sidelobe that is 6 dB smaller than the main lobe.

The above optimized predetermined sequence is characterized with hierarchical cyclic properties according to which for instance every binary sub-sequence of length L occurs exactly once, every sub-sequence of length L−1 exactly twice, every sub-sequence of length L−2 exactly four times, and so on.

Figure 4B:
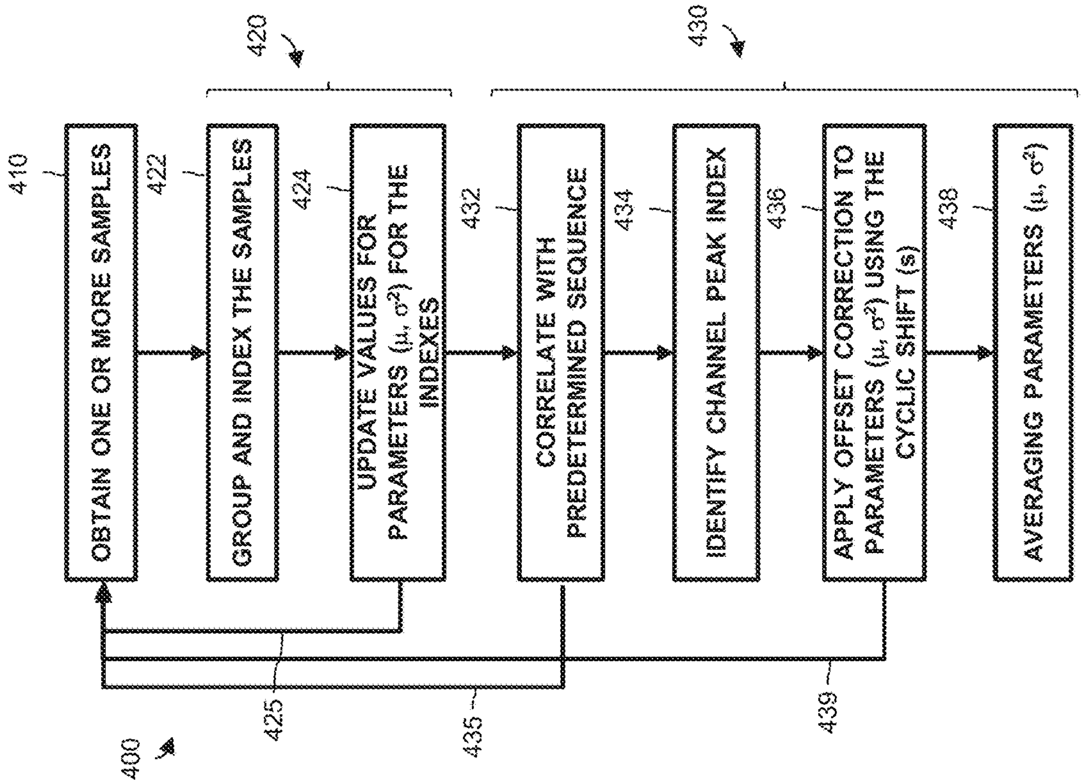
FIG. 4B shows details of various steps of FIG. 3C according to example embodiments of the present disclosure.
Figure 4A:
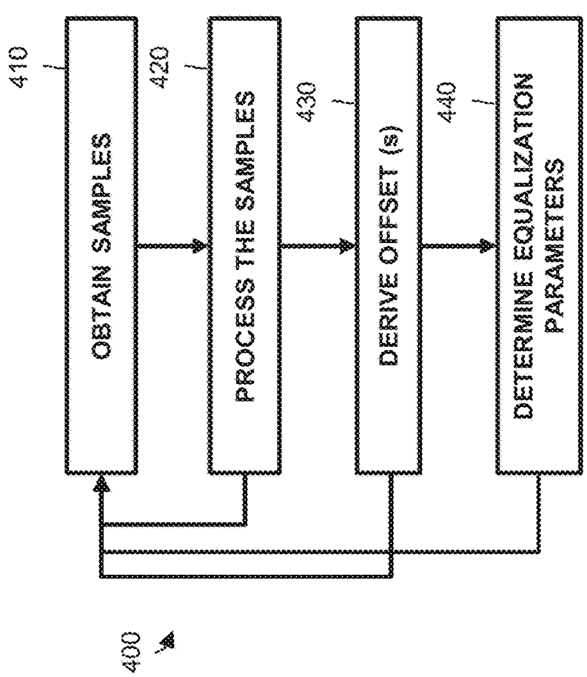
FIG. 4A shows steps for training the equalizer training unit of FIG. 3C according to example embodiments of the present disclosure.

The operation of the EQ training unit 320 will be now explained with reference to FIG. 4A and FIG. 4B. FIG. 4A shows a simplified overview of the steps performed by the equalizer training unit of FIG. 3A and FIG. 4B shows a more detailed overview of the steps of FIG. 4A.

As described above, an ONU 131-133 transmits over the ODN 120 to the OLT 110 the training sequence 220 as part of the preamble of its burst transmission. The OLT, thus, receives samples that correspond to the training sequence 220. Logically, the received samples will exhibit the same periodic and cyclic properties as the transmitted training sequence. These properties are herein exploited to derive the equalization parameters as follows.

In the first step, the EQ training unit 320 obtains 410 the received samples. As detailed above, the received samples will exhibit the same periodic and cyclic properties of the transmitted training sequence. As the training sequence and its properties are known to the equalizer 300, the EQ training unit 320 is able to exploit its periodic and cyclic characteristics to derive the equalization parameters for the equalizer unit 310. To do so, the EQ training unit, and more specifically its estimation unit 330, processes 420 the obtained samples to estimate N sets of parameters indicative of the obtained samples' values. The estimated N sets of parameters 334 are then fed to the correlation unit 340 which then derives 430 the cyclic shift or offset s 336. The estimation unit 330 then cyclically shifts the estimated N sets of parameters based on the cyclic shift s derived by the correlation unit and, finally, determines 440 the equalization parameters 314 therefrom. These steps will be now described in detail below.

In processing step 420, firstly the obtained samples are grouped and indexed 422 as follows. The obtained samples are grouped in p non-overlapping sets of N subsequent samples, where p corresponds to the number of times the predetermined sequence is repeated in the training sequence and N to the number of sub-sequences cyclically contained in the predetermined sequence. Further, the grouping of the samples is done according to their order of reception so that the order of the sub-sequences within the predetermined sequence is respected. As a result, the respective groups of samples within a sample set p will contain samples corresponding to a cyclically shifted version of the predetermined sequence due to above mentioned arbitrary time misalignment. In practice, the grouping is affected by associating the samples with $N\in[1, \ldots, N]$ indices in accordance with their order of reception. Once, index N is reached, i.e. once a sample is associated with index N, the indexing re-starts from 1 until all obtained samples are indexed. This is conceptually illustrated in FIG. 3C which shows an example of a training sequence 220 with a period length of N=8 and comprising a predetermined sequence 222 of 8 symbols repeated 4 times, i.e. N=M=8 and p=4, as transmitted by the ONU 131-133 (top) and as received by the OLT (bottom) with a time misalignment of three symbols. As shown in the figure, after grouping the received samples as detailed above, 4 sets of 8 samples corresponding to a cyclically shifted version of the transmitted predetermined sequence 222 are obtained. In this particular example, the sixth sample 234 in the respective sets of samples, 232, corresponds to the first symbol sub-sequence 224 of the predetermined sequence 222.

As the order of the samples in a set corresponds to the order of the symbols in the predetermined sequence, the first sample of the respective sample sets will always correspond to the same symbol sub-sequence. The same holds for the second sample of the respective sets and so on. As a result, samples of the respective samples sets associated with the same index, e.g. index i, can be used to compute the values for the i-th parameter set, e.g. a mean and variance of a Gaussian distribution $\{\mu_i, \sigma_i^2\}$, which will be used to derive the equalization parameters. However, the ordering of the parameter sets will be cyclically shifted in the same way as the received samples by an a priori unknown amount s. That is, the i-th received sample of every sample set will correspond to transmit sequence (i-s) mod N and the i-th computed parameter set will thus actually correspond to parameter set (i-s) mod N.

Thus, in the next step, the grouped and indexed samples are used for the computation 424 of the N sets of parameters, e.g. N corresponding Gaussian means $\mu_i$ and variances $\sigma_i^2$ as follows:

$$\mu_i = \frac{\sum_{k=1}^{p} y_k^i}{p}, \forall\, i = 1\,..N \tag{1}$$

$$\sigma_i^2 = \frac{1}{p}\sum_{k=1}^{p}\left(y_k^i - \mu_i\right)^2, \forall\, i = 1\,..N, \tag{2}$$

where the received samples $y_k^i$ at the i-th index of all p groups are used to compute the mean and variance values for the symbol sub-sequence $x_i$. In the MLSE context, the combination of Gaussian mean $\mu_i$ and variance $\sigma_i^2$ for transmitted sub-sequence $x_i$ is commonly referred to as the i-th branch metric, BM, parameter set. The obtained mean values are then used to construct a vector of a length N. Further, one approach for implementing Equation (1) and (2) would be a two-pass algorithm, i.e., a first pass to compute the means and then a sequence pass to compute the variances. However, when all receive samples cannot be stored in memory, also single-pass algorithms can be used like for instance those described by Chan et. al., "*Algorithms for Computing the Sample Variance: Analysis and Recommendations.*", The American Statistician, vol. 37, no. 3, 1983, pp. 242-47.

Instead of algorithmically calculating the means and variances as in Equation (1), the parameter sets that are derived may constitute sets of parameters of probability functions or a set of histograms. In the latter case, the values for the respective bins will hold the cumulative sums of the samples associated with the respective indices.

After the computation of the parameter sets, the method proceeds to derive 430 the offset or the cyclic shift s. Herein, this is done by correlating 432 the cyclically-shifted versions of the predetermined sequence 222 with the obtained set of means $\mu_i$, $i\in\{1, \ldots, N\}$ or by calculating the circular cross-correlation between the values of the estimated parameters and the predetermined sequence. In the case of histograms, conventional methods can be used to directly derive the mean values derived from the histogram corresponding to each index. Since these mean values correspond to received samples averaged over the p periods, a cyclically shifted N-tap finite impulse response (FIR) channel estimate $\hat{h}$ can easily be obtained from the estimated μ values with little additional complexity. Mathematically, this corresponds to the following operation in case of a real-valued symbols:

$$\hat{h} = \frac{1}{N} P^T \mu \quad (3)$$

where μ is the N-vector of means, and P is a Toeplitz matrix according to the correlation operation with cyclically-shifted versions of the predetermined sequence 222 as follows:

$$P^T = \begin{bmatrix} x_1 & x_2 & \ldots & x_{N-1} & x_N \\ x_N & x_1 & & x_{N-2} & x_{N-1} \\ \vdots & & \ddots & & \vdots \\ x_2 & x_3 & \ldots & x_N & x_1 \end{bmatrix} \quad (4)$$

In contrast to the conventional pilot training schemes, herein the correlation unit 340 can operate at a slow pace. That is, it needs to compute N correlations values either only once after sufficient convergence of the mean values (or after a fixed timing offset) or only after processing every e.g. 2 to 3 blocks of N receive samples.

Based on the M-tap FIR channel estimate $\hat{h}$, the cyclic shift s of the BM parameter sets can be determined by simply identifying 434 the channel peak index. The channel peak index, herein, indicates the index of the parameter sets corresponding to the start symbol sub-sequence 224 in the transmitted predetermined sequence 222, i.e. the index of the sub-sequence 232 in the received samples 230.

Figure 5:
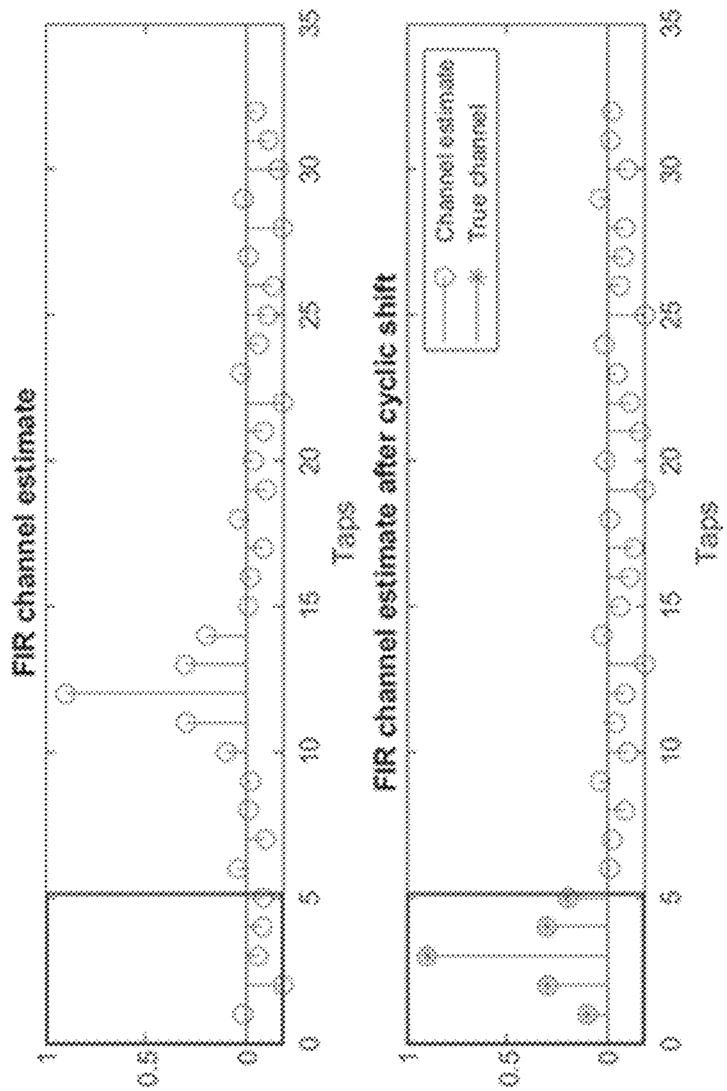
FIG. 5 shows an example of the estimated channel response and its cyclic compensated version according to the present disclosure.

Once, the channel peak index is identified, the cyclic shift s may be compensated 436 for by cyclically-shifting the estimated set of means and variances with the cyclic shift s. Correcting the cyclic shift in this way allows to position the peak of the channel estimate $\hat{h}$ inside the L-tap MLE-based equalizer window such that for instance the window contains maximum channel energy, as shown in FIG. 5. The channel peak index has a direct relation to the cyclic misalignment 234, i.e., the cyclic misalignment correction or cyclic shift s should be chosen such that the channel peak occurs within the L-tap equalizer window. The shift value can be chosen to perfectly correspond with the channel peak index but doesn't have to be.

After cyclic compensation 436, if the predetermined sequence comprises one or more repeated sub-sequences, the method proceeds to average 438 the computed parameter sets into M (where M=2^L for binary symbols) sets taking into account their occurrences $\pi_1, \ldots, \pi_N$ in the predetermined sequence. Thus, if N=M=2^L, no averaging is required, while if N=2^(L+1) and every sub-sequence occurs exactly twice, then the N Gaussian means $\mu_i$ and variances $\sigma_i^2$ are averaged into corresponding N/2 means and variances. For example, if an optimized predetermined sequence with hierarchical cyclic properties as the one described above is used, 32 means and variances will be computed in step 424. After the cyclic compensation in step 436, these 32 means and variances are averaged into the corresponding 16 or 8 or 4 means and variances according to the value of M, i.e. the number of unique sub-sequences in the predetermined sequence.

Herein again, the averaging step 438 may be implemented by means of a histogram. In this case, the cumulative values of the histogram bins of the histograms corresponding to the respective indices can simply be added together.

Figure 4C:
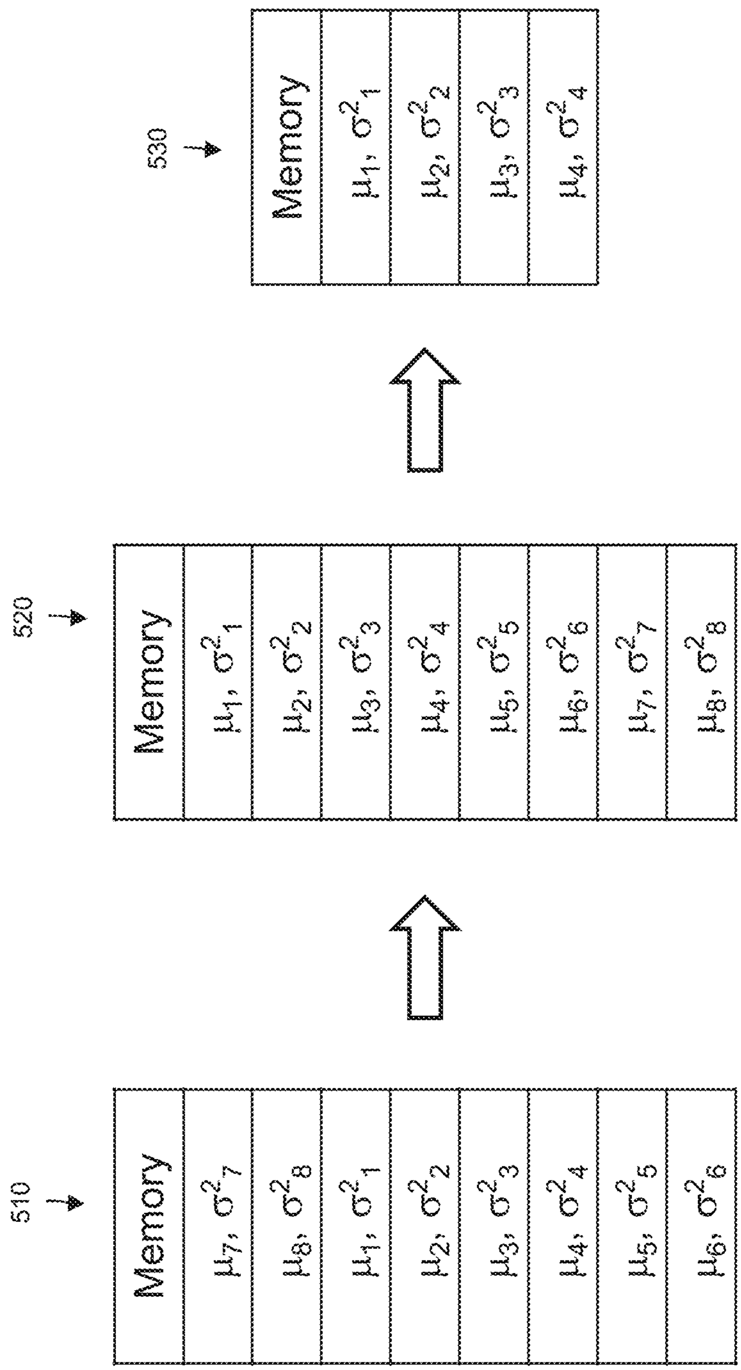
FIG. 4C shows an example of the sets of parameters at different stages of the processing according to the present disclosure.

FIG. 4C shows this concept in three tables. The first table, i.e. table 510, shows the Gaussian means $\mu_i$ and variances $\sigma_i^2$ determined after processing the obtained samples, the second table, i.e. table 520, shows the N Gaussian means $\mu_i$ and variances $\sigma_i^2$ offset in accordance with the determined cyclic shift s, and the last table, i.e. table 530, shows the averaged Gaussian means $\mu_i$ and variances $\sigma_i^2$.

Using a predetermined sequence with one or more repeating sub-sequences is especially relevant in case the channel impulse response is longer than the number of taps L in the MLE-based equalizer, meaning that K>L consecutive symbols impact any received sample. In this case, increasing the sub-sequence length L to K with K>L, in combination with averaging the BM parameters, avoids having biased BM parameters and poor equalization performance. Thus, the length L of the sub-sequences contained within the training sequence is a design parameter which if too short leads to poor equalizer performance, while if too long leads to a large memory overhead for storing many intermediate BM parameters.

In the final step, i.e. step 440, the equalization parameters are determined. This step is done as conventionally, by converting the means and variances to usable Branch Metrics, e.g. in the form of Log Likelihood Ratios.

Optionally, before determining the equalization parameters, the newly derived means and variances may be averaged with the previously estimated means and variances. For example, the exponential moving averaging may be employed as follows:

$$\mu_i = a(\mu_i) + (1-a)\mu_i'$$

$$\sigma_i^2 = a(\sigma_i^2) + (1-a)\sigma_i'^2$$

where $\mu_i$ and $\sigma_i^2$ are the newly estimated mean and variance estimates and $\mu_i'$ and $\sigma_i'^2$ are the previous estimates for the i-th index and a is a weight coefficient. The averaging of the mean and variances needs to be performed after the cyclic compensation, i.e. step 436, and the averaging step 438. Alternatively, the same averaging technique may be applied after the equalization parameters are determined, i.e. after step 440. In this case, the newly estimated equalization parameters will be averaged with the previously obtained equalization parameters.

Further, as the skilled person will recognize, the processing of the samples in step 420, the deriving of the offset in step 430, as well as the determining of the equalization parameters in step 440, may be performed in batches, in other words, iteratively. The iterative processing of these steps may be done in various ways, some of which are detailed below.

For example, once a batch of one or more samples is obtained, the samples are indexed as detailed in step 422 above, followed by updating 424 the means and variances accordingly. The method then returns 425 to obtain 410 another batch of samples and so on until the update 424 of the means and variances for all samples is completed. Thus, the method loops through steps 410 to 424 until all samples are processed and then proceed to complete steps 430 and 440 as detailed above.

Alternatively, instead of returning to obtain another batch of samples, the method may proceed to correlate 432 the current estimate of the means and variances with the predetermined sequence to obtain the current channel estimate $\hat{h}$. Once, the current channel estimate is obtained, the method may return 435 to obtain 410 another batch of samples. This way the method loops through steps 410 to 432 until all samples are processed, thus obtaining every iteration or batch an updated channel estimate. Once all samples are processed and the final channel estimate is obtained, the method proceeds accordingly to complete the steps 434 to 438 and 440 as detailed above.

Alternatively, instead of returning 435 to obtain another batch of samples, the method may proceed to determine the equalization parameters by identifying the channel peak index 434 and applying the offset correction 436 after the current channel estimate $\hat{h}$ is obtained 432. Once, the current equalization parameters are obtained, the method may return 439 to obtain 410 another batch of samples. This way the method loops through steps 410 to 436 until all samples are processed, thus obtaining at every iteration an updated set of parameters.

Optionally, to further reduce the complexity of the channel equalizer 300, the channel equalizer 300 may be preceded by a linear equalizer, such as a feedforward equalizer, FFE, that operates as a channel shortening filter in order to reduce the complexity of the MLE-based equalizer. The FFE is a low-complexity yet suboptimum alternative channel equalization approach that employs a linear transversal filtering to the received symbol sequence which has a computational complexity that grows linearly with the number of coefficients. Alternatively, a non-linear equalizer such as decision feedback equalizer, DFE, may be used instead. Compared to an FFE, a DFE equalizer stage has the advantage of not amplifying the receiver noise.

Figure 6:
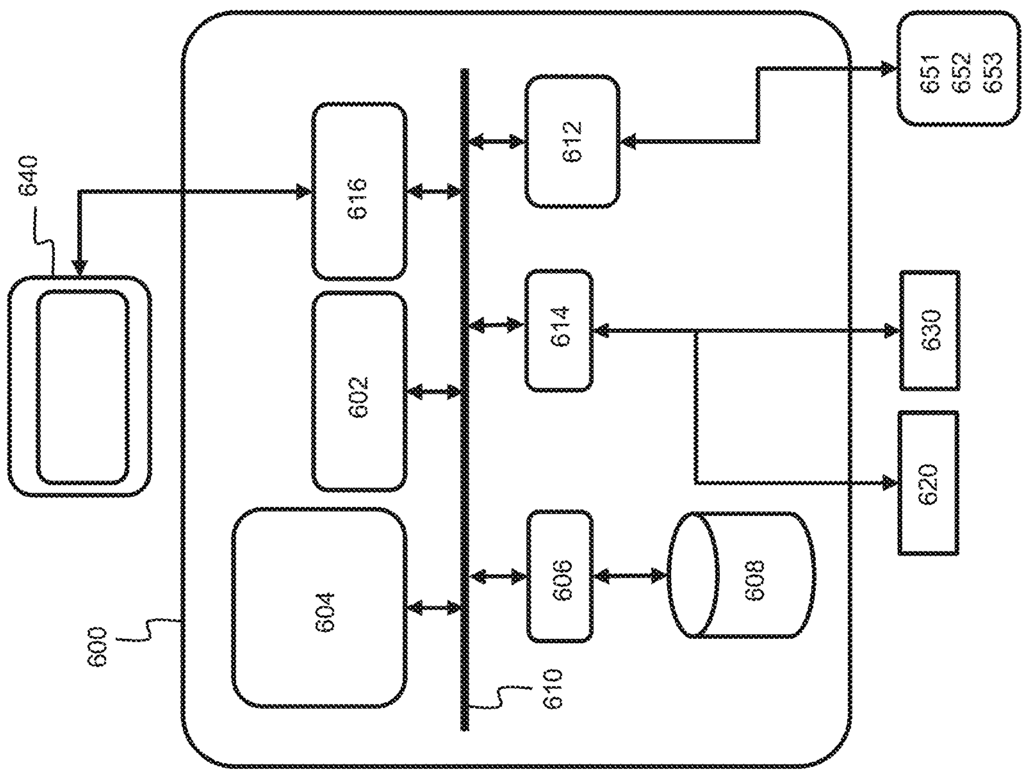
FIG. 6 shows an example embodiment of a suitable computing system for performing one or several steps in embodiments of the present disclosure.

FIG. 6 shows a suitable computing system 600 enabling to implement embodiments of the method for determining equalization parameters for an equalizer for compensating data-dependent distortions according to the present disclosure. Computing system 600 may, in general, be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory, RAM, or another type of dynamic storage device that stores information and instructions for execution by processor 602 and/or read-only memory, ROM, or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with other computing devices 701, 702, 703. The communication interface 612 of computing system 600 may be connected to such another computing system by means of a local area network, LAN, or a wide area network, WAN, such as for example the internet. Storage element interface 606 may comprise a storage interface such as for example a Serial Advanced Technology Attachment, SATA, interface or a Small Computer System Interface, SCSI, for connecting bus 610 to one or more storage elements 608, such as one or more local disks, for example, SATA disk drives, and control the reading and writing of data to and/or from these storage elements 608. Although the storage element(s) 608 above is/are described as a local disk, in general, any other suitable computer-readable media such as a removable magnetic disk, optical storage media such as a CD or DVD, -ROM disk, solid-state drives, flash memory cards, . . . could be used. Computing system 600 could thus correspond to the equalizer 300 or the equalizer training unit 320 in the embodiments shown by FIG. 3A.

As used in this application, the term "circuitry" may refer to one or more or all of the following:

(a) hardware-only circuit implementations such as implementations in only analog and/or digital circuitry and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An equalizer training unit for deriving equalization parameters for compensating data-dependent distortion in received samples, the equalizer training unit comprising at least one processor and at least one memory including computer program code, the at least one memory and computer program code configured to, with the at least one processor, cause the equalizer training unit to perform:

obtaining samples corresponding to a training sequence transmitted from a communication device, the training sequence comprising a sequence p>1 times, the sequence cyclically comprising N sub-sequences of respective combinations of L time-domain symbols of a modulation scheme, wherein the N sub-sequences are cyclically arranged in a selected order and such that L−1 symbols of a respective sub-sequence overlap with symbols in preceding and following sub-sequences;

estimating N sets of parameters based on the obtained samples and by taking into account periodic properties of the training sequence;

deriving an offset based on the estimated N sets of parameters and by taking into account properties of the sequence; and determining the equalization parameters based on the estimated N sets of parameters and the derived offset, wherein p, N, and L are each a respective integer number.

2. The equalizer training unit according to claim 1, wherein the estimating comprises:

grouping the obtained samples in p non-overlapping sets of N subsequent samples in accordance with their order of reception;

indexing the N subsequent samples of the respective p sets in accordance with their order in the set to obtain N sets of p samples associated with respective indices; and processing the samples associated with the respective indices to obtain the N sets of parameters associated with the respective indices.

3. The equalizer training unit according to claim 2, wherein the obtained N sets of parameters comprise values indicative of values of the samples associated with the respective indices.

4. The equalizer training unit according to claim 3, wherein the deriving comprises correlating the values from the N sets of parameters with the sequence.

5. The equalizer training unit according to claim 1, where the determining comprises cyclically shifting the N sets of parameters according to the derived offset and determining the equalization parameters for the corresponding N sub-sequences based on the shifted sets of parameters.

6. The equalizer training unit according to claim 1, wherein one or more of the N sub-sequences are repeated two or more times within the sequence, and wherein the determining further comprises combining the corresponding obtained sets of parameters taking into account the occurrences of the respective N sub-sequences within the sequence.

7. The equalizer training unit according to claim 6, wherein the respective N sub-sequences are repeated an equal number of times within the sequence.

8. The equalizer training unit according to claim 1, wherein the estimating, the deriving, and the determining are performed iteratively, wherein at a respective iteration the estimating, the deriving, and the determining are performed on one or more of the obtained samples.

9. The equalizer training unit according to claim 1, wherein the determining further takes into account one or more previously determined equalization parameters.

10. The equalizer training unit according to claim 9, wherein the obtained N sets of parameters are averaged by means of an exponential moving averaging with the one or more previously determined N sets of parameters.

11. The equalizer training unit according to claim 1, wherein the obtained samples are pre-processed by a linear equalizer and/or a nonlinear equalizer.

12. An equalizer for compensating data-dependent distortion in received samples by equalizing the received samples based on equalization parameters, the equalizer comprising an equalizer training unit configured to derive the equalization parameters, the equalizer training unit comprising at least one processor and at least one memory including computer program code, the at least one memory and computer program code configured to, with the at least one processor, cause the equalizer training unit to perform:

obtaining samples corresponding to a training sequence transmitted from a communication device, the training sequence comprising a sequence p>1 times, the sequence cyclically comprising N sub-sequences of all respective combinations of L time-domain symbols of a modulation scheme, wherein the N sub-sequences are cyclically arranged in a selected order and such that L−1 symbols of a respective sub-sequence overlap with symbols in preceding and following sub-sequences;

estimating N sets of parameters based on the obtained samples and by taking into account periodic properties of the training sequence;

deriving an offset based on the estimated parameters and by taking into account properties of the sequence; and determining the equalization parameters based on the estimated parameters and the derived offset, wherein p, N, and L are each a respective integer number.

13. A training sequence generator unit comprising at least one processor and at least one memory including computer program code, the at least one memory and computer program code configured to, with the at least one processor, cause the training sequence generator unit to:

generate a training sequence for use in a communication device for compensating data-dependent distortion in received data, the training sequence comprising a sequence p>1 times, the sequence cyclically comprising N sub-sequences of all respective combinations of L time-domain symbols of a modulation scheme, wherein the N sets are cyclically arranged in a selected order and such that L−1 symbols of a respective sub-sequence overlap with symbols in preceding and following sub-sequences, and wherein p, N, and L are each a respective integer number.

* * * * *